United States Patent
Broadfoot et al.

(10) Patent No.: US 11,623,428 B2
(45) Date of Patent: Apr. 11, 2023

(54) LOAD-BEARING COMPOSITE PLATFORM

(71) Applicant: USA as represented by the Secretary of the Army, Washington, DC (US)

(72) Inventors: Meredith B. Broadfoot, Madison, AL (US); Earl W. Thomas, Madison, AL (US)

(73) Assignee: United States Government as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 17/390,421

(22) Filed: Jul. 30, 2021

(65) Prior Publication Data
US 2023/0036562 A1 Feb. 2, 2023

(51) Int. Cl.
*B32B 3/12* (2006.01)
*B32B 5/26* (2006.01)
*B32B 27/12* (2006.01)
*B32B 7/12* (2006.01)

(52) U.S. Cl.
CPC ............... *B32B 5/265* (2021.05); *B32B 3/12* (2013.01); *B32B 7/12* (2013.01); *B32B 27/12* (2013.01); *B32B 2255/26* (2013.01); *B32B 2262/106* (2013.01); *B32B 2307/744* (2013.01)

(58) Field of Classification Search
CPC ...................................................... B32B 3/12
See application file for complete search history.

(56) References Cited

U.S. PATENT DOCUMENTS

| | | | | |
|---|---|---|---|---|
| 4,357,292 | A | * | 11/1982 | Myers ..................... B29C 70/46 156/181 |
| 4,687,691 | A | | 8/1987 | Kay |
| 4,879,152 | A | | 11/1989 | Green |
| 5,034,256 | A | | 7/1991 | Santiso, III et al. |
| 5,455,096 | A | * | 10/1995 | Toni .......................... B32B 7/12 428/116 |
| 6,679,969 | B1 | | 1/2004 | Fournier et al. |
| 6,825,137 | B2 | | 11/2004 | Fu et al. |
| 7,288,164 | B2 | | 10/2007 | Chevette et al. |
| 7,682,697 | B2 | | 3/2010 | Raghavendran et al. |
| 9,260,063 | B2 | | 2/2016 | Zaiser |

(Continued)

OTHER PUBLICATIONS

Chemsol, "Technical Data Sheet MIL-DTL-53039C TY.III" 2013, p. 1-2. https://chemsol.com/wp-content/uploads/2013/11/MIL-DTL-53039C-Ty.-III.pdf (Year: 2013).*

(Continued)

*Primary Examiner* — Mark Ruthkosky
*Assistant Examiner* — Julia L Rummel
(74) *Attorney, Agent, or Firm* — Karen G. Hazzah

(57) ABSTRACT

The present disclosure provides a load-bearing composite platform. The platform includes a core layer, first and second reinforcement layers, and a frame. The core layer includes a structural sublayer, a force distribution sublayer, and an abrasion prevention sublayer. The first reinforcement layer is adhered to the force distribution sublayer, and the second reinforcement layer is adhered to the structural sublayer. The second reinforcement layer is an inverse of the first reinforcement layer. The frame surrounds the first reinforcement layer, the second reinforcement layer, and the core layer.

15 Claims, 13 Drawing Sheets

(56) References Cited

U.S. PATENT DOCUMENTS

| | | | |
|---|---|---|---|
| 10,793,201 B1* | 10/2020 | Johnston, VII | B32B 5/024 |
| 2005/0123717 A1 | 7/2005 | Shen | |
| 2007/0269645 A1 | 11/2007 | Raghavendran | |
| 2008/0236056 A1* | 10/2008 | Hourihan | E04B 1/34807 52/79.9 |
| 2009/0184200 A1 | 7/2009 | Lin et al. | |
| 2016/0264761 A1* | 9/2016 | Timberlake | C08L 63/00 |
| 2017/0182741 A1 | 6/2017 | Ayithi | |
| 2018/0290420 A1* | 10/2018 | Olk | B32B 1/04 |

OTHER PUBLICATIONS

NV Specialty Coatings (Scheda Tecnica "N-9008 SAND-FS 33531", 2013, p. 1-7. https://www.mandacoatings.co.uk/pdf/TDS_N-9008_Sand%20FS%2033531_Revi%206.pdf (Year: 2013).*

Lum, W.; Pope, D.; Escarsega, J.; "Chemical Agent Resistant Coating Topcoat Usage: Drivers and Trends", Army Research Laboratory, 2012, p. 1-20. https://apps.dtic.mil/sti/pdfs/ADA568229.pdf (Year: 2012).*

* cited by examiner

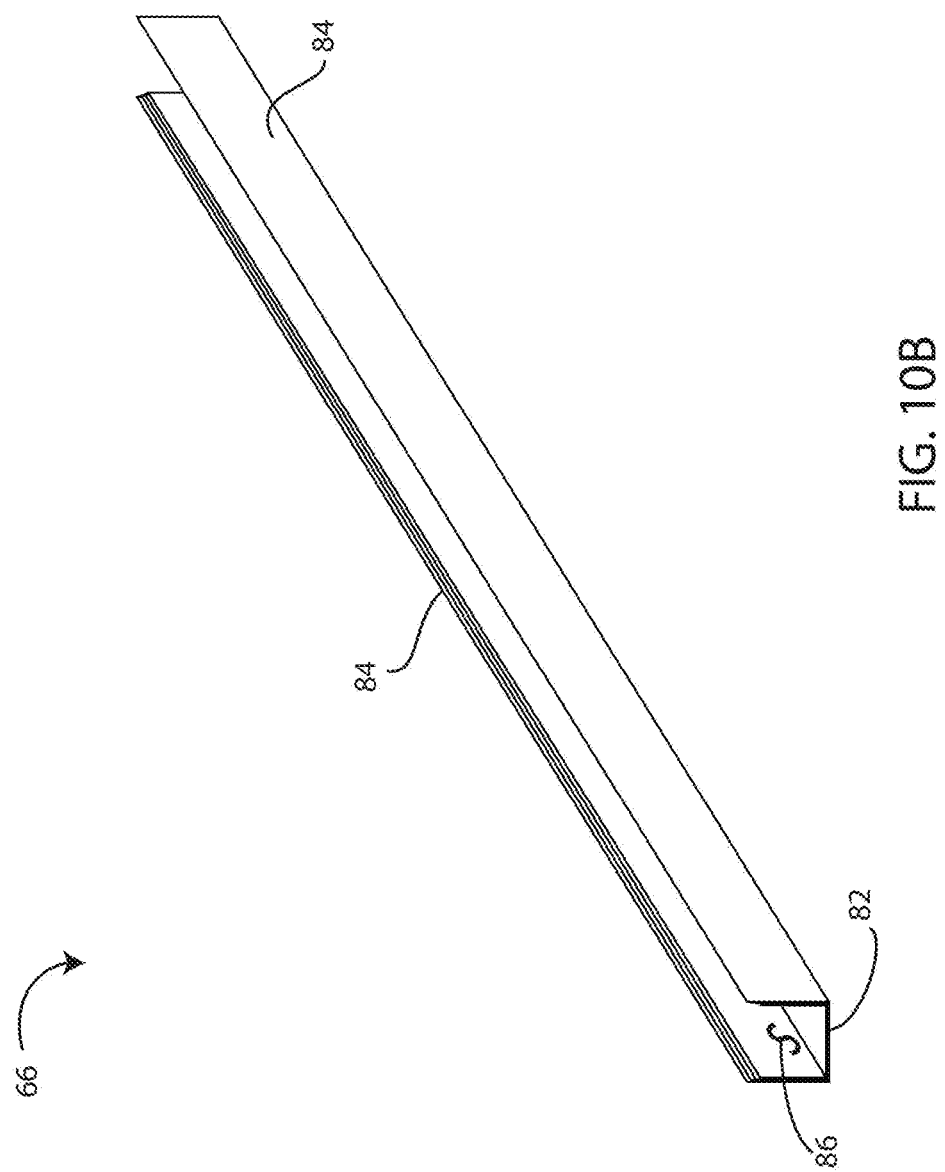

LOAD-BEARING COMPOSITE PLATFORM

FIELD

The present disclosure generally relates to a load-bearing platform, and more specifically, a load-bearing composite platform.

BACKGROUND

Load-bearing composite platforms are used in a variety of industries. One industry that relies on load-bearing composite platforms is the aircraft maintenance industry. In this industry, maintainers and technicians utilize load-bearing composite platforms to perform various tasks, including inspection and maintenance of aircraft components. Depending on the situation, the load-bearing composite platform may be connected to the aircraft during the aircraft's operation. Several factors must be taken into consideration in this type of a situation, including weight of the load-bearing composite platform and potential exposure of the load-bearing composite platform to harsh environmental conditions.

Load-bearing composite platforms are often constructed from metal materials, such as, for example, aluminum. Load-bearing composite platforms are designed to be sufficiently thick to be able to withstand any heavy loads associated with equipment, maintainers, and/or technicians. However, when a load-bearing composite platform is connected to the aircraft during the aircraft's operation, the weight of the platform often becomes a concern. Additionally, metal materials often experience corrosions issues when exposed to harsh environmental conditions associated with, for example, salt water.

Therefore, a new load-bearing composite platform is needed to address the weight and corrosion issues associated with load-bearing composite platforms constructed from metal materials.

BRIEF SUMMARY

In one embodiment, the present disclosure provides a load-bearing composite platform. The load-bearing composite platform has a core layer, first and second reinforcement layers, and a frame. The core layer has a structural sublayer, a force distribution sublayer, and an abrasion prevention sublayer. The structural sublayer has a lattice based on a repeating geometric shape. The lattice has an upper face and a lower face. The force distribution sublayer has an upper face and a lower face. The force distribution sublayer is configured to disperse a downward force applied to the upper face of the force distribution sublayer across the upper face of the lattice. The abrasion prevention sublayer is located between the upper face of the lattice and the lower face of the force distribution sublayer. The abrasion prevention sublayer is configured to prevent the lattice of the structural sublayer from abrading the force distribution sublayer. The first reinforcement layer is adhered to the upper face of the force distribution sublayer and the second reinforcement layer is adhered to the lower face of the lattice. Each of the first and second reinforcement layers have at least one carbon fiber ply. The second reinforcement layer is an inverse of the first reinforcement layer. The frame encloses the first reinforcement layer, the second reinforcement layer, and the core layer.

BRIEF DESCRIPTION OF THE DRAWINGS

For a better understanding of the nature and objects of the disclosure, reference should be made to the following detailed description taken in conjunction with the accompanying drawings, in which:

FIG. 10B is a to perspective view of the closeout straight edge of the frame.

Reference is made in the following detailed description of preferred embodiments to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

Figure 1:
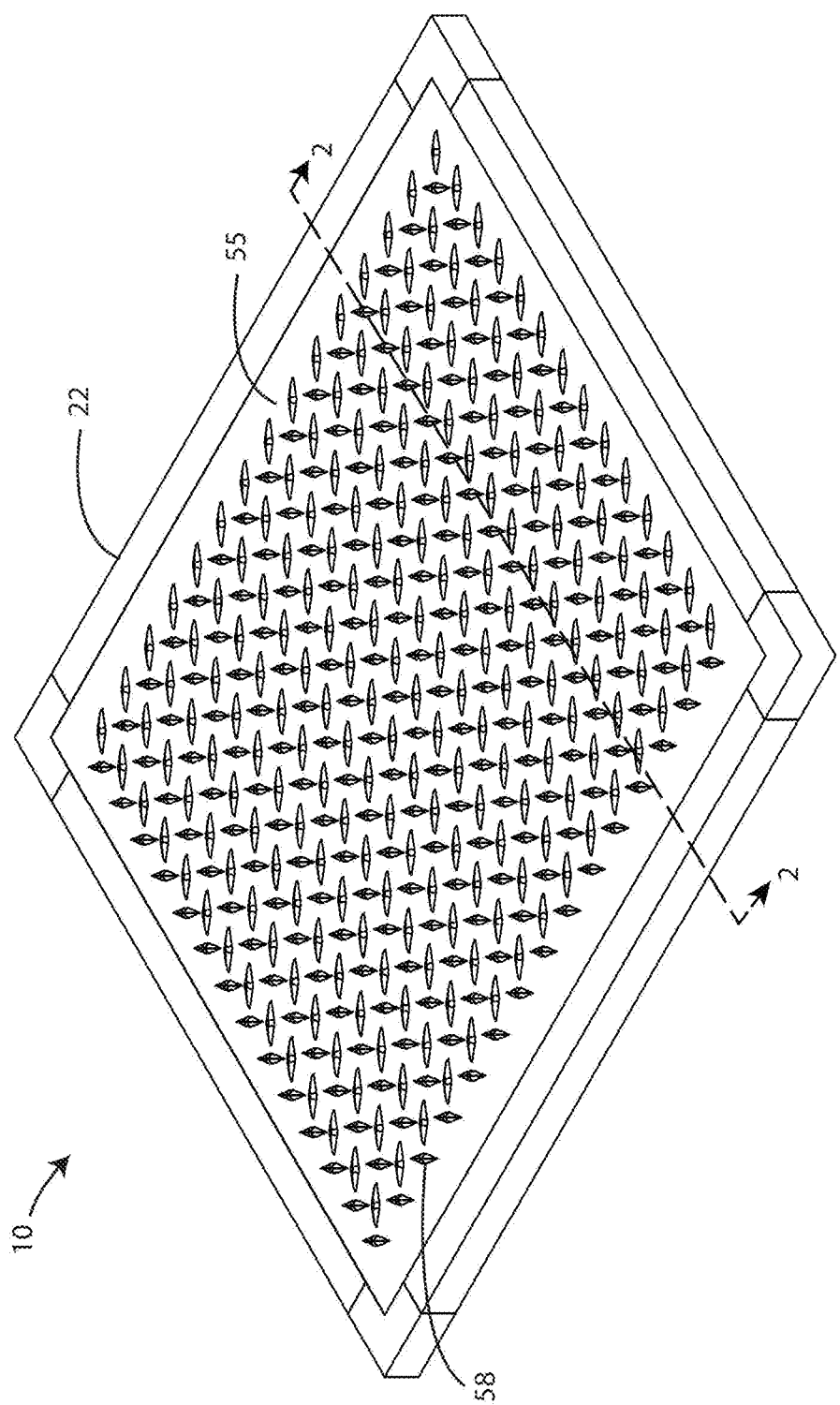
FIG. 1 is a top perspective view of a load-bearing composite platform in accordance with the present disclosure, the load-bearing composite platform having a frame.
Figure 2:
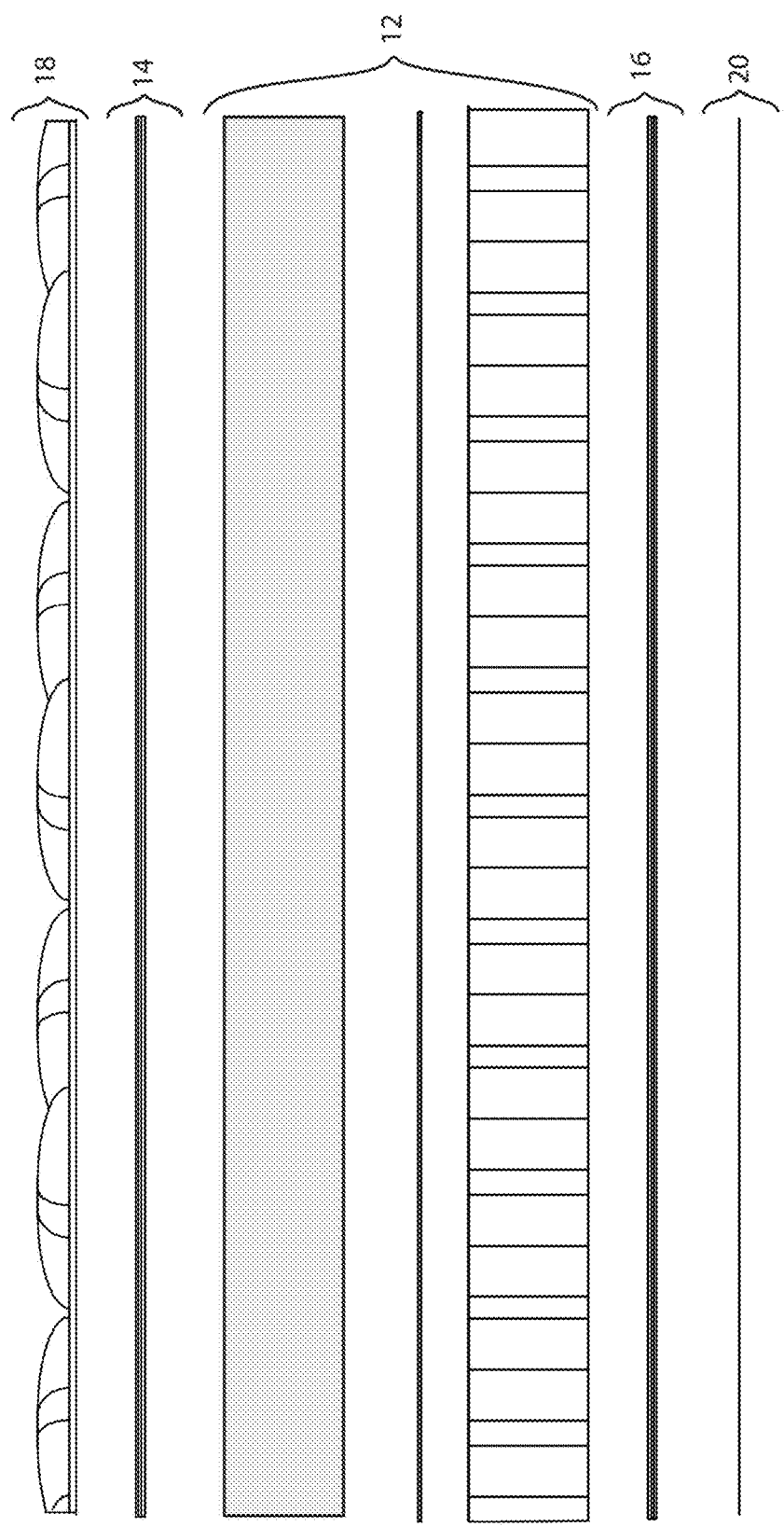
FIG. 2 is an exploded, cross-sectional view of the load-bearing composite platform taken along line 2-2 in FIG. 1, the cross-sectional view excluding the frame.
Figure 3:
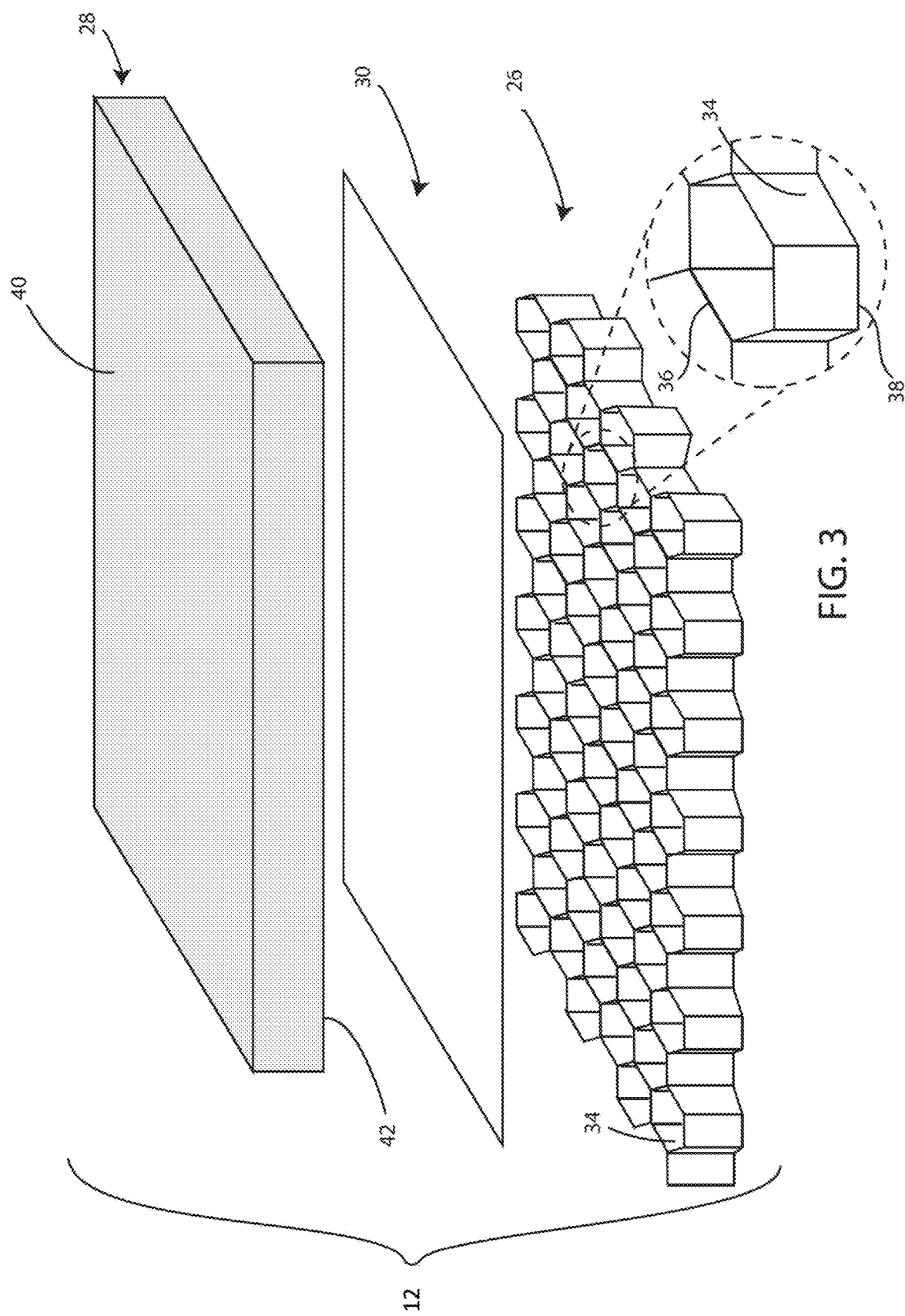
FIG. 3 is an exploded view of a core layer of the load-bearing composite platform.

The present disclosure provides a load-bearing composite platform 10. As seen in FIG. 1 and the exploded cross-sectional view in FIG. 2, the load-bearing composite platform 10 has a core layer 12, a first reinforcement layer 14, a second reinforcement layer 16, a traction layer 18, a base layer 20, and a frame 22. As seen in FIG. 3, the core layer 12 of the load-bearing composite platform 10 has a structural sublayer 26, a force distribution sublayer 28, and an abrasion prevention sublayer 30. The structural sublayer 26 has a lattice 34 based on a repeating geometric shape. A person of ordinary skill in the art will understand that the repeating geometric shape could be, for example, of a honeycomb shape. Alternatively, the repeating geometric shape on which the lattice 34 is based could be of a triangular shape, a diamond shape, a rectangular shape, or any other repeatable geometric shape. In one embodiment, the lattice 34 of the structural sublayer 26 could be made of a glass-reinforced plastic (also referred to as fiberglass). Alternatively, the lattice 34 of the structural sublayer 26 could be made of carbon fiber reinforced plastic, Nomex aramide paper reinforced plastic, aluminum, or any other suitable material known to a person of ordinary skill in the art. The lattice 34 of the structural sublayer 26 has an upper face 36 and a lower face 38.

Figure 4:
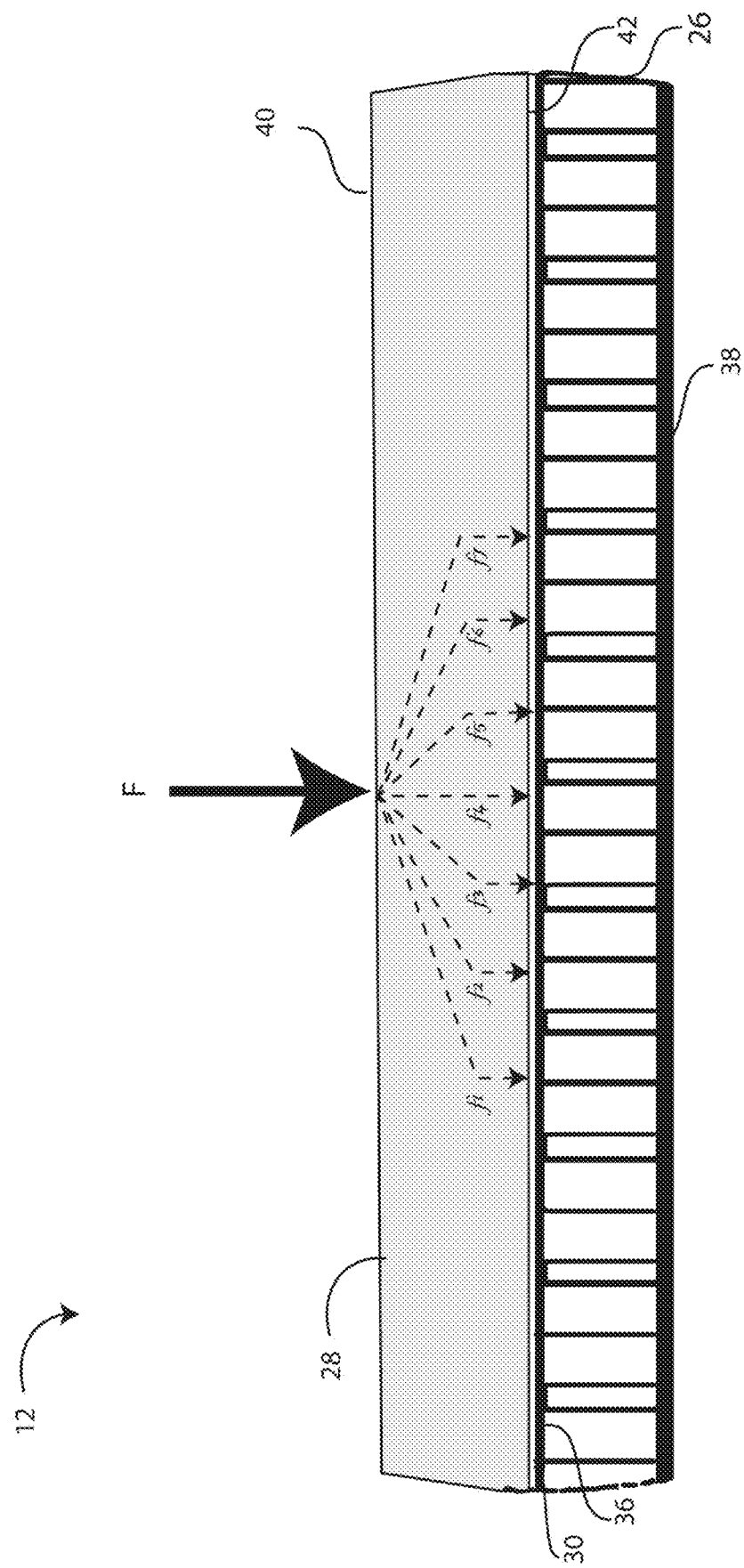
FIG. 4 is an illustration of the core layer, the illustration showing how the force distribution sublayer disperses a force.

As seen in FIG. 4, the force distribution sublayer 28 has an upper face 40 and a lower face 42. The force distribution sublayer 28 is configured to disperse a downward force F applied to the upper face 40 of the force distribution sublayer 28 across the upper face 36 of the lattice 34 (illustrated by $f_1, f_2, \ldots f_n$). Thus, the force distribution sublayer 28 ensures that the downward force F applied to the load-bearing composite platform 10 is distributed across a surface area of the upper face 36 of the lattice 34 that is greater than or equal to a surface area of the upper face 40 of the force distribution sublayer 28. In one embodiment, the force distribution sublayer 28 could be made of a vinyl foam. More specifically, in one embodiment, the force distribution sublayer 28 could be a closed cell vinyl foam having a density of 3 lb./cubic foot (e.g., Divinycell Foam). Alternatively, the force distribution sublayer 28 could also be made from a solid synthetic rubber, a plastic dilatant, a semisolid, or a combination thereof, as well as any other suitable material known to a person of ordinary skill in the art.

Figure 5:
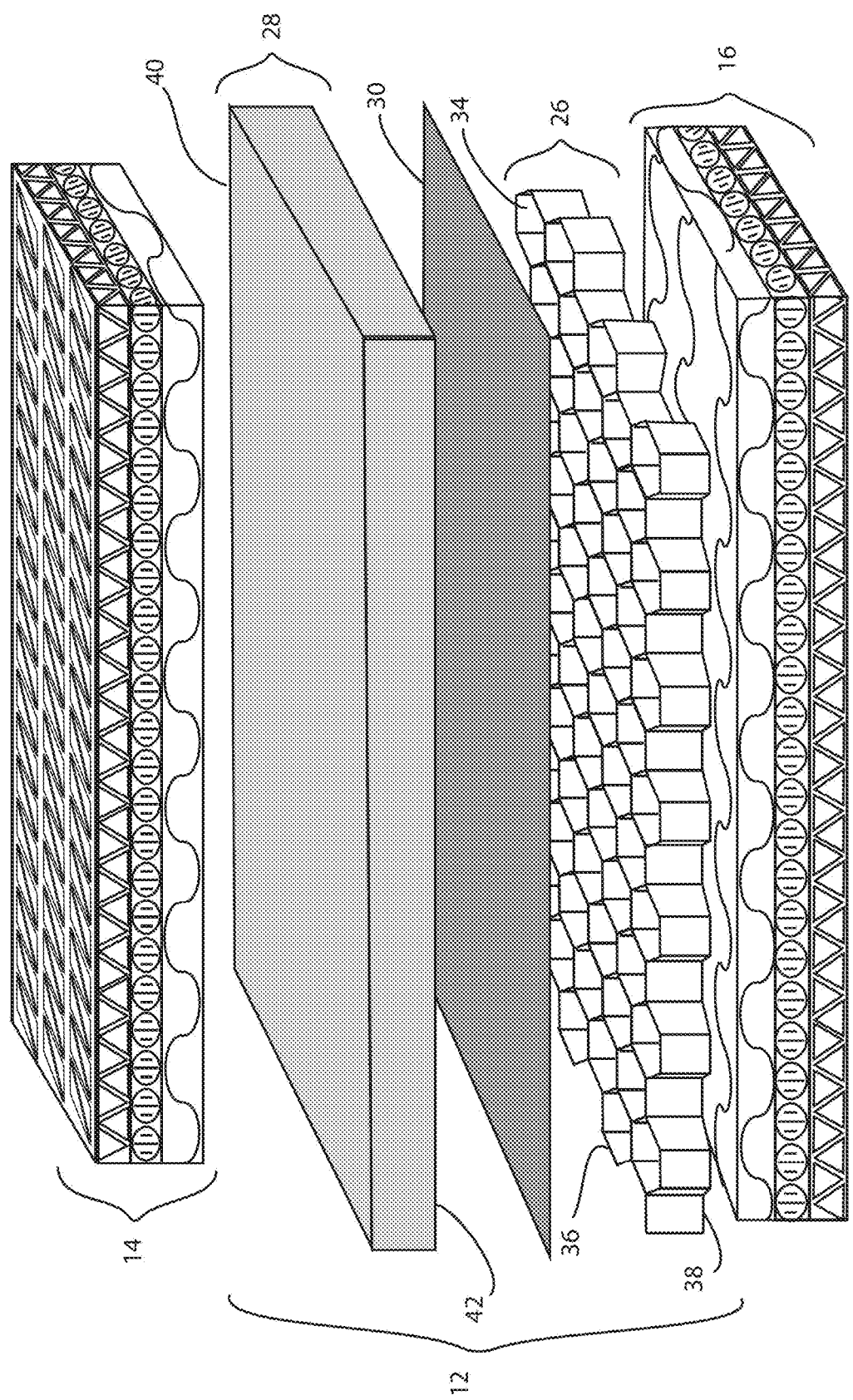
FIG. 5 is an exploded view of a first reinforcement layer, the core layer, and a second reinforcement layer of the load-bearing composite platform

As can be seen in FIGS. 4-5, the abrasion prevention sublayer 30 is located between the lower face 42 of the force distribution sublayer 28 and the upper face 36 of lattice 34. The abrasion prevention sublayer 30 prevents the upper face 36 of the lattice 34 from contacting the lower face 42 of the force distribution sublayer 28. When the force distribution sublayer 28 disperses the downward force applied to the upper face 40 of the force distribution sublayer 28, the lower face 42 of the force distribution sublayer 28 could be damaged by contacting the upper face 36 of the lattice 34. The abrasion prevention sublayer 30 prevents the force distribution sublayer 28 from being damaged by the lattice 34. In one embodiment, the abrasion prevention sublayer 30 may be a ply of aerospace grade carbon fiber (e.g., T300 carbon fiber) adhered to the upper face 36 of the lattice 34 via structural film adhesive (e.g., AF-163 film adhesive).

As shown in FIG. 5, the first reinforcement layer 14 and the second reinforcement layer 16 are orientated such that the first reinforcement layer 14 adheres to the upper face 40 of the force distribution sublayer 28 and the second reinforcement layer 16 adheres to the lower face 38 of the lattice 34. In one embodiment of this disclosure, the adhesion of the first reinforcement layer 14 and the upper face 40 of the force distribution sublayer 28 is via structural film adhesive. Similarly, the adhesion of the second reinforcement layer 16 to the lower face 38 of the lattice 34 is via structural film adhesive. As a person of ordinary skill in the art would understand, the type of structural film adhesive may vary. For example, structural film adhesive in use could be epoxy, silicone, urethane, acrylic, or any other film with adhesive properties.

Figure 6:
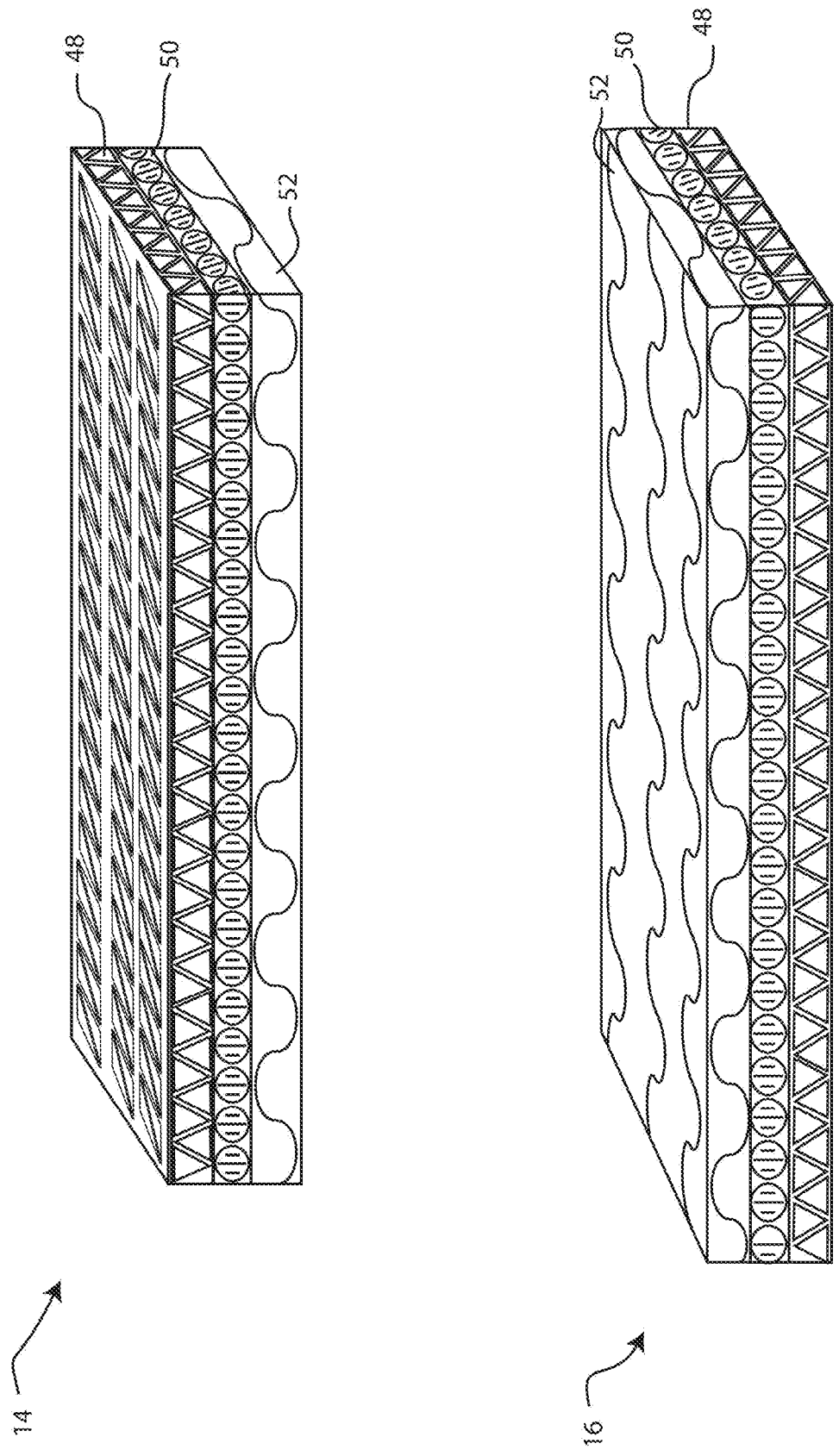
FIG. 6 is an illustration generally showing the first reinforcement layer and the second reinforcement layer.

As shown in FIGS. 5-6, the first reinforcement layer 14 and the second reinforcement layer 16 each comprise at least one carbon fiber ply. In a preferred embodiment, the first reinforcement layer 14 and the second reinforcement layer 16 each comprise two carbon fiber plies 48,50 and a fiberglass cloth 52. One example of a fiberglass cloth in accordance with the present disclosure is a Park Electrochemical Nelcote® E-765 Epoxy Prepreg, 7781 E-Glass Reinforced cloth. The second reinforcement layer 16 is identical to, and the inverse of, the first reinforcement layer 14. The first and second reinforcement layers 14, 16 provide additional strength for the load-bearing composite platform 10. The first and second reinforcement layers 14, 16 provide a symmetrical layup for the load-bearing composite platform 10 about the core layer 12.

Figure 7:
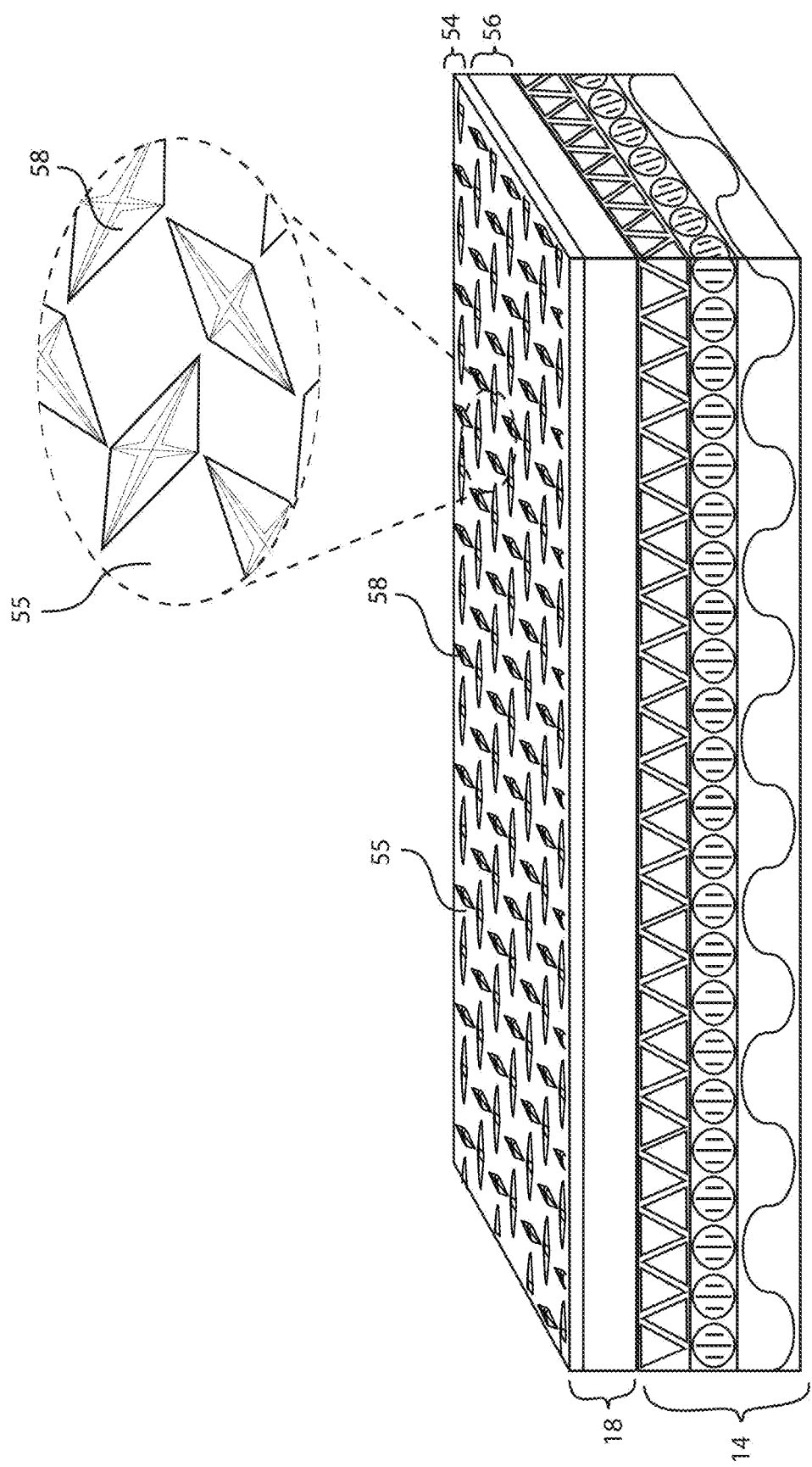
FIG. 7 is an illustration generally showing a traction layer and the first reinforcement layer.

As shown in FIG. 7, the traction layer 18 has an upper traction sublayer 54 and a lower traction sublayer 56. The upper traction sublayer 54 comprises a high temperature epoxy resin and a fiber glass cloth, and the lower traction sublayer 56 comprises a high temperature epoxy resin and a milled glass cloth. The upper traction sublayer 54 includes a plurality of protrusions 58 molded into a diamond plate pattern. One of ordinary skill in the art would understand, however, that the plurality of protrusions 58 could be arranged in a variety of patterns. The upper traction sublayer 54 may also have a finish that is a chemical agent resistant coating. In one embodiment, the finish is a single component, polymeric flattened, chemical agent resistant, aliphatic polyurethane coating compliant with defense detail spec MIL-DTL-53039. A person of ordinary skill in the art will understand that, as an alternative, the finish could be a coating including various components. The upper traction sublayer 54 may further include polymeric beads homogenously blended to the finish. Coupled with plurality of protrusions 58, the finish and the polymeric beads ensure that the upper traction layer 54 provides a non-skid upper surface 55. As used in this disclosure, the term "nonskid surface" refers to a surface designed to inhibit an object from sliding along said surface upon which the object is resting. The finish provides extra toughness and flexibility for the load-bearing composite platform 10. Accordingly, the finish mitigates the damage impact of tools or other heavy objects dropped onto the load-bearing composite platform 10.

Figure 8:
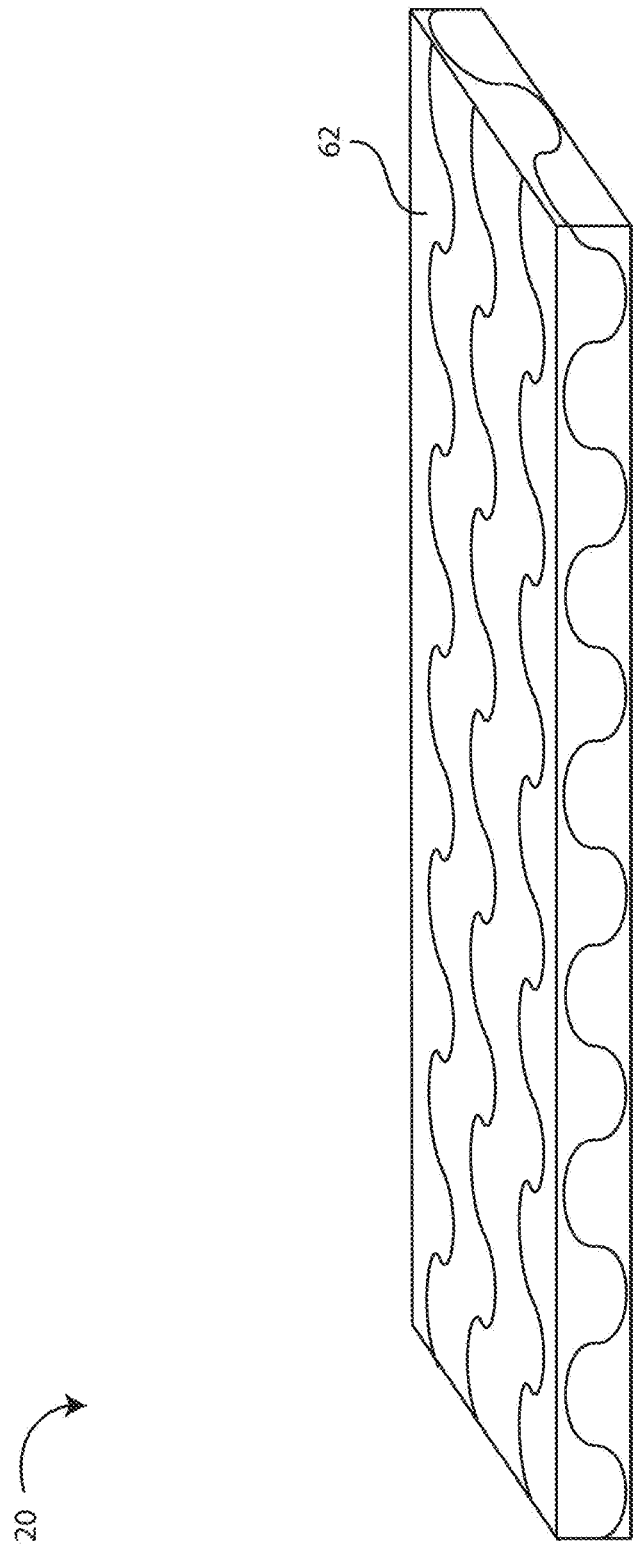
FIG. 8 is an illustration generally showing a base of the load-bearing composite platform.

As seen in FIG. 8, the base layer 20 includes a fiberglass cloth 62. One example of a fiberglass cloth in accordance with the present disclosure is a Park Electrochemical Nelcote® E-765 Epoxy Prepreg, 7781 E-Glass Reinforced cloth.

Figure 9:
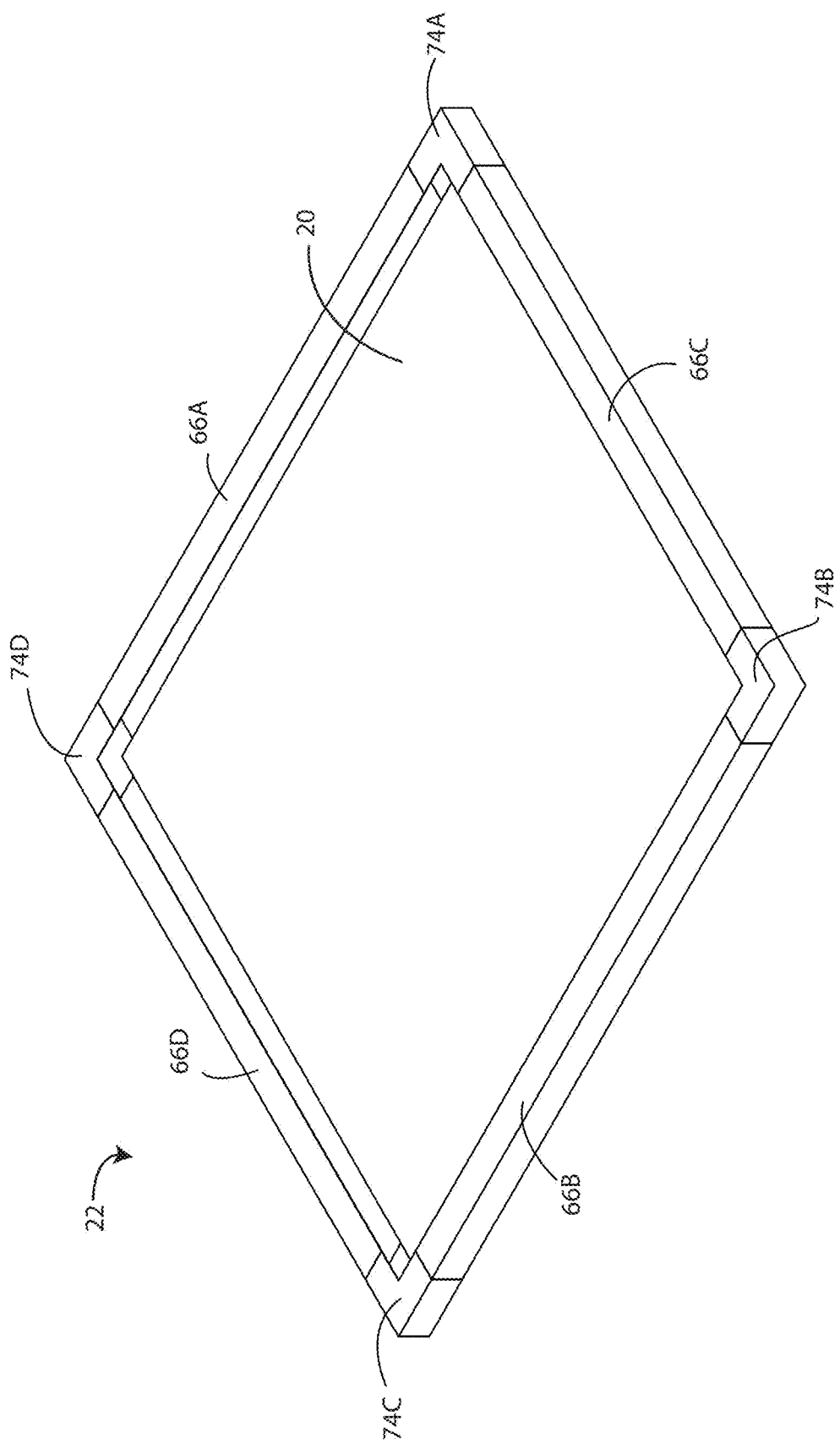
FIG. 9 is a top perspective view of the frame of the load-bearing composite platform.

As seen in FIG. 9, the frame 22 is configured to enclose the traction layer 18, the first reinforcement layer 14, the core layer 12, the second reinforcement layer 16, and the base layer 20. The frame 22 includes a plurality of components. More specifically, the frame 22 includes a first pair of opposing closeout straight edges 66A, 66B, a second pair of opposing closeout straight edges 66C, 66D, and a plurality of closeout corners 74A-74D. Each component of the frame 22 is made of at least one a fiberglass cloth. One example of a fiberglass cloth in accordance with the present disclosure is a Park Electrochemical Nelcote® E-765 Epoxy Prepreg, 7781 E-Glass Reinforced cloth. More specifically, each component of the frame 22 includes a plurality of plies of fiberglass cloth.

Figure 10A:
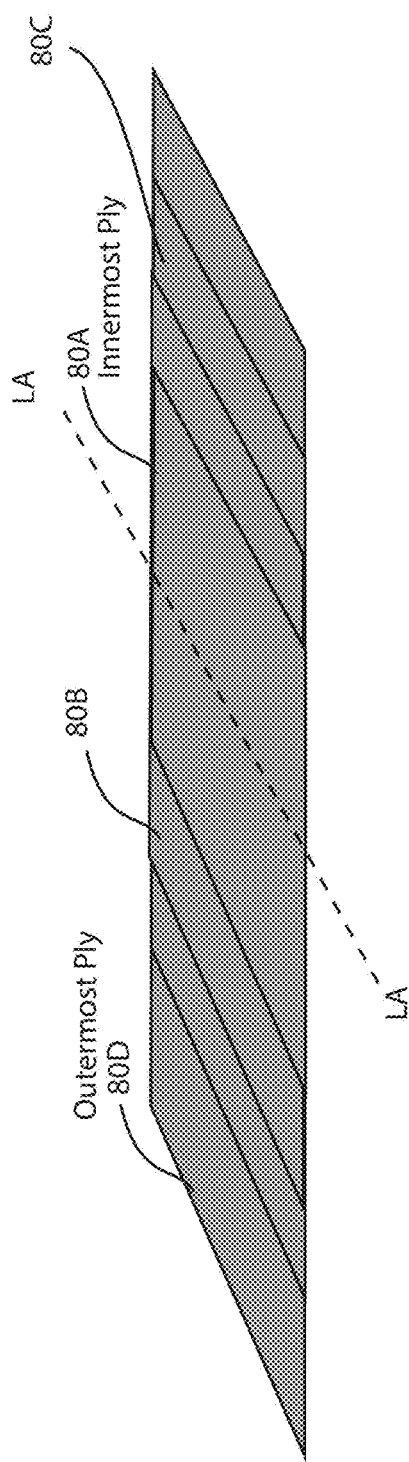
FIG. 10A is an illustration of a closeout straight edge layup displaying varying width.

As seen in FIG. 10A, each closeout straight edge 66 includes a plurality of plies of fiberglass cloth 80A-80D. Each ply of fiberglass cloth 80 is of a varying width and oriented about a longitudinal axis LA. The plies of fiberglass cloth 80 are laid up in a manner such that an outermost ply of fiberglass cloth 80 (designated in the drawing as "Outermost Ply") is of the greatest width relative to the other plies, and an innermost play of fiberglass cloth 80A (designated in the drawing as "Innermost Ply") is of the smallest width relative to the other plies. Accordingly, the plies of fiberglass cloth 80D-80A are laid up from greatest width to smallest width and oriented about the longitudinal axis LA. The plurality of plies of fiberglass cloth 80 are then formed into a C-shaped channel.

As seen in FIG. 10B, the C-shaped channel has a backbone 82 and a pair of legs 84 extending from the backbone 82. The backbone 82 and pair of legs 84 collectively form a stair-step opening 86 of varying height H. The varying height H results from the way the plies of fiberglass cloth 80 are laid up from greatest width to smallest width and oriented about the longitudinal axis LA. The stair-step opening 86 is configured to receive the traction layer 18, the first reinforcement layer 14, the core layer 12, the second reinforcement layer 16, and the base layer 20. The lay-up of the closeout straight edge 66 is critical because the backbone 82 and the portion of the pair of legs 84 immediately adjacent the backbone 82 must be able to withstand the highest amount of stress. At the same time, the lay-up of the closeout straight edge 66 ensures that any lip or edge formed between traction layer 18 and the closeout straight edge 66 is minimal, thereby minimizing any trip hazard.

Figure 11:
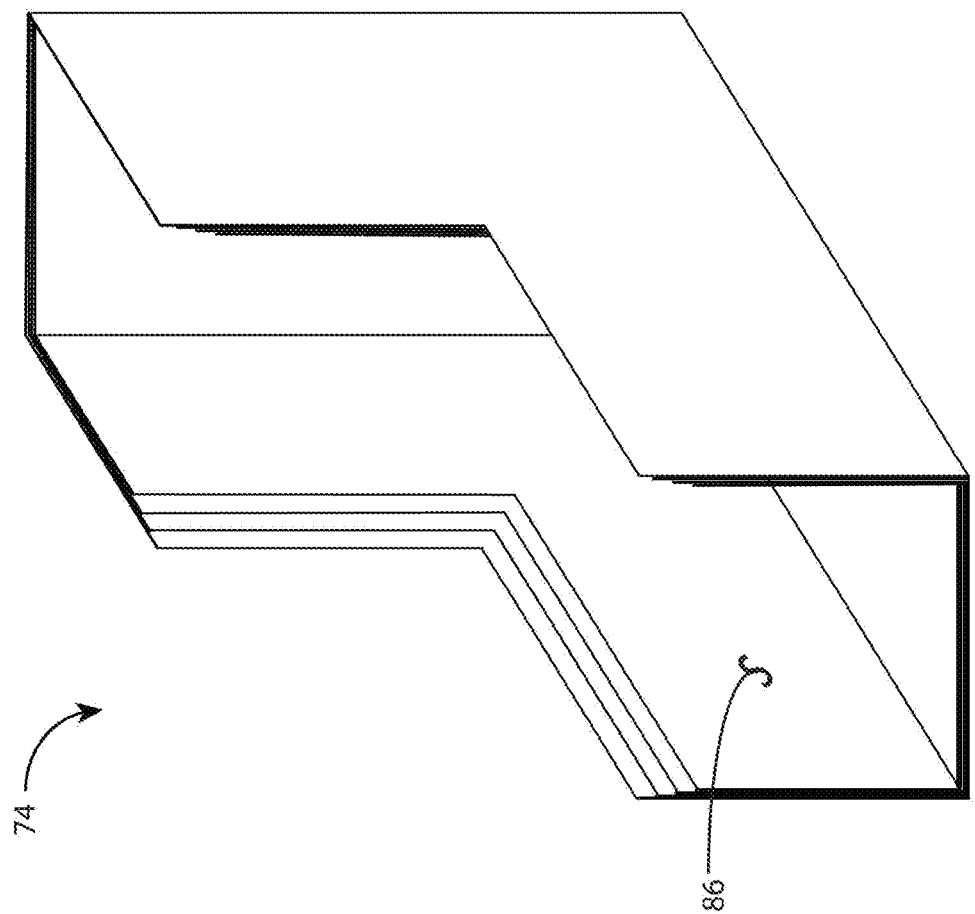
FIG. 11 a top perspective view of a closeout corner of the frame.

As seen in FIG. 11, each closeout corner 74 also includes a plurality of plies of fiberglass cloth. The closeout corner 74 is formed substantially similar to the closeout straight edge 66 such that the closeout corner also has a stairstep opening 88 of varying height H. As previously discussed with regard to the lay-up of the closeout straight edge 66, the lay-up of the closeout corner 74 ensures the closeout corner is able to withstand the high amount of stress on a backbone portion while also ensuring that any lip or edge formed between the traction layer and the closeout corner is minimal.

Figure 12:
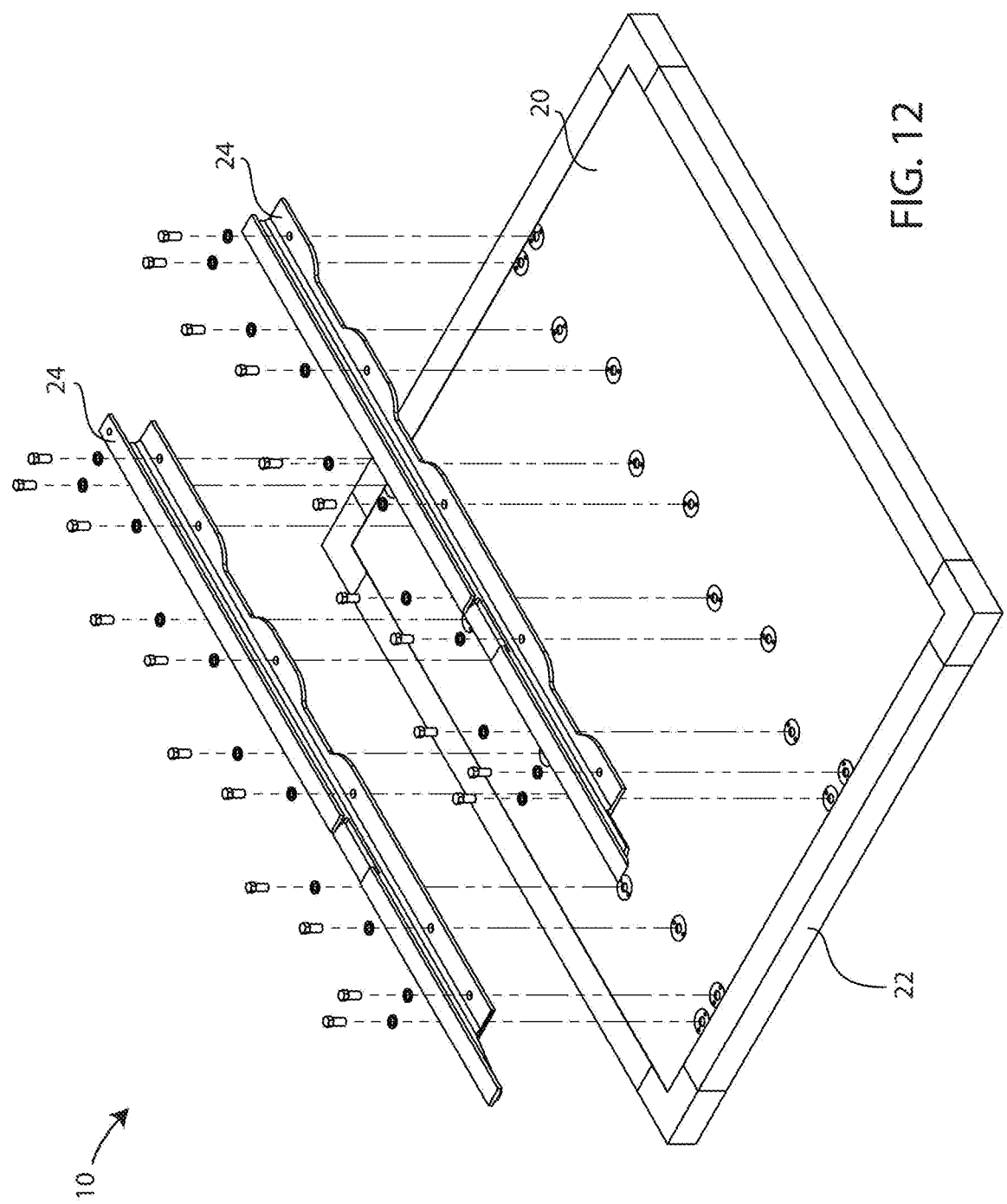
FIG. 12 is a bottom perspective view of the load-bearing composite platform shown in FIG. 1 with a pair of attachments rails.

When assembled via a film adhesive, the frame 22 encloses the traction layer 18, the first reinforcement layer 14, the core layer 12, the second reinforcement layer 16, and the base layer 20 in a manner such that the load-bearing composite platform 10 has a water-tight seal. The fully composite design of the load-bearing composite platform 10 mitigates the issue of corrosion experienced in previous load-bearing composite platforms made of metal. The load-bearing composite platform 10 can be used, for example, as a maintenance platform for a helicopter. For such a scenario, the load-bearing composite platform 10 may further comprise a pair of attachment rails 24, as seen in FIG. 12, that enable the load-bearing composite platform to be attached to a helicopter. The attachment rails 24 may connect to the base layer 20 of the load-bearing composite platform 10 via a plurality of fasteners. The attachment rails 24 may be configured to attach to a frame or similar structure of a helicopter.

The load-bearing composite platform 10 of the present disclosure can support multiple maintainers and/or technicians while sustaining little to no permanent deformation. For example, in one embodiment consistent with the present disclosure, the load-bearing composite platform 10 could withstand two maintainers, each having an assumed weight of 200 lbm without experiencing any permanent deformation. The non-skid upper surface 55 of the load-bearing composite platform 10 ensures that maintainers and/or other technicians on the platform do not slip while working on, for example, a helicopter.

The foregoing description has been presented for the purposes of illustration and description. It is not intended to be exhaustive or to limit the disclosure to the precise form disclosed. Many modifications and variations are possible in view of this disclosure. Indeed, while certain features of this disclosure have been shown, described and/or claimed, it is not intended to be limited to the details above, since it will be understood that various omissions, modifications, substitutions and changes in the apparatuses, forms, method, steps and system illustrated and in its operation can be made by those skilled in the art without departing in any way from the spirit of the present disclosure.

Further, the foregoing description, for purposes of explanation, used specific nomenclature to provide a thorough understanding of the disclosure. However, it will be apparent to one skilled in the art that the specific details are not required in order to practice the disclosure. Thus, the foregoing descriptions of specific embodiments of the present disclosure are presented for purposes of illustration and description. They are not intended to be exhaustive or to limit the disclosure to the precise forms disclosed, many modifications and variations are possible in view of the above teachings. The embodiments were chosen and described in order to best explain the principles of the disclosure and its practical applications, to thereby enable others skilled in the art to best utilize the disclosed system and method, and various embodiments with various modifications as are suited to the particular use contemplated.

What is claimed is:

1. A load-bearing composite platform comprising:
    a core layer having a structural sublayer, a force distribution sublayer, and an abrasion prevention sublayer, the structural sublayer comprising a lattice based on a repeating geometric shape, the lattice having an upper face and a lower face, the force distribution sublayer comprising a vinyl foam or one or more of a solid synthetic rubber, a plastic dilatant, and a semisolid, and having an upper face and a lower face, the force distribution sublayer being configured to disperse a downward force applied to the upper face of the force distribution sublayer across the upper face of the lattice, the abrasion prevention sublayer being located between the upper face of the lattice and the lower face of the force distribution sublayer, the abrasion prevention sublayer being configured to prevent the lattice of the structural sublayer from abrading the force distribution sublayer;
    first and second reinforcement layers, the first reinforcement layer adhered to the upper face of the force distribution sublayer and the second reinforcement layer adhered to the lower face of the lattice, each of the first and second reinforcement layers comprising a plurality of plies including at least one carbon fiber ply, the second reinforcement layer having an inverted orientation relative to the first reinforcement layer; and
    a frame, the frame enclosing a perimeter portion of the first reinforcement layer, the second reinforcement layer, and the core layer, the frame comprising at least one sheet of fiberglass, each sheet of fiberglass having a longitudinal axis and a width perpendicular to the longitudinal axis, the width extending from a first longitudinal edge margin to a second longitudinal edge margin of the sheet, each sheet of fiberglass being formed to have a C-shaped cross-sectional shape along said perimeter portion such that the first longitudinal edge margin of each sheet of fiberglass is above the first reinforcement layer and the second longitudinal edge margin of each sheet of fiberglass is below the second reinforcement layer.

2. The load-bearing composite platform of claim 1, wherein the platform further comprises a traction layer, the traction layer being adhered to the first reinforcement layer, the traction layer having a nonskid upper surface.

3. The load-bearing composite platform of claim 1, wherein the platform further comprises a traction layer, wherein the traction layer comprises an upper traction sublayer and a lower traction sublayer, the lower traction layer being adhered to the first reinforcement layer, the upper traction sublayer comprising a high temperature an epoxy resin and a fiberglass cloth, the lower traction sublayer comprising a high temperature an epoxy resin and milled glass fiber.

4. The load-bearing composite platform of claim 3, wherein the upper traction sublayer includes a plurality of protrusions arranged in a diamond plate pattern.

5. The load-bearing composite platform of claim 4, wherein the upper traction sublayer comprises a nonskid upper surface, the nonskid upper surface comprising a coating and a plurality of polymeric beads.

6. The load-bearing composite platform of claim 5, wherein the coating is a single component, polymeric flattened, chemical agent resistant, aliphatic polyurethane coating.

7. The load-bearing composite platform of claim 1, wherein the first reinforcement layer is adhered to the upper face of the force distribution sublayer via a structural adhesive film, and the second reinforcement layer is adhered to the lower face of the lattice via a structural adhesive film.

8. The load-bearing composite platform of claim 7, wherein each of the first and second reinforcement layers comprises a plurality of carbon fiber plies and a fiberglass cloth.

9. The load-bearing composite platform of claim 8, wherein the fiberglass cloth comprises a plurality of plies.

10. The load-bearing composite platform as set forth in claim 1, wherein each sheet of fiberglass comprises an outer ply having a first width extending from a respective first longitudinal edge margin to a respective second longitudinal edge margin and an inner ply having a second width extending from a respective first longitudinal edge margin to a respective second longitudinal edge margin.

11. The load-bearing composite platform as set forth in claim 10, wherein the first width is greater than the second width such that a first longitudinal edge margin of the outer ply protrudes inwardly beyond the first longitudinal edge margin of the inner ply and the second longitudinal edge margin of the outer ply protrudes inwardly beyond the second longitudinal edge margin of the inner ply.

12. The load-bearing composite platform as set forth in claim 11, wherein the at least one sheet of fiberglass further comprises a middle ply sandwiched between the outer ply and the inner ply.

13. The load bearing composite platform as set forth in claim 12, wherein the middle ply has a third width less than the first width and greater than the second width.

14. The load bearing composite platform as set forth in claim 1, further comprising attachment rails inboard of the perimeter portion of the first reinforcement layer.

15. The load bearing composite platform as set forth in claim 14, wherein the attachment rails are configured to mount the load-bearing composite platform on a helicopter frame.

* * * * *